United States Patent Office 3,350,424
Patented Oct. 31, 1967

3,350,424
3α-AZIDO-5α-ANDROSTAN-17-ONE AND DERIVATIVES THEREOF
Paul D. Klimstra, Northbrook, Ill., assignor to G. D. Searle & Co., Chicago, Ill., a corporation of Delaware
No Drawing. Filed Feb. 28, 1966, Ser. No. 530,322
10 Claims. (Cl. 260—349)

The present invention is concerned with novel steroidal derivatives characterized by an azido substituent and, more particularly, with 17-oxygenated 3α-azido steroids of the androstane family. Those compounds are pictorially represented by the following structural formula

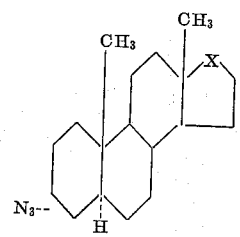

wherein the group symbolized by X can be carbonyl or a radical of the formula

wherein Y is hydrogen or a lower alkanoyl radical and Z is a lower aliphatic hydrocarbon radical.

The lower alkanoyl radicals represented by Y in the foregoing structural representation are typified by formyl, acetyl, propionyl, butyryl, valeryl, caproyl, heptanoyl and the branched-chain groups isomeric therewith.

Examples of the lower aliphatic hydrocarbon radicals symbolized by Z are lower alkyl radicals such as methyl, ethyl, propyl, butyl, pentyl, hexyl and heptyl, lower alkenyl radicals such as vinyl, propenyl, butenyl, pentenyl, hexenyl and heptenyl and lower alkynyl radicals such as ethynyl, propynyl, butynyl, pentynyl, hexynyl and heptynyl together with the corresponding branched-chain isomers.

The compounds of the present invention are conveniently manufactured by utilizing as starting materials 3β-hydroxy substances represented by the following structural formula

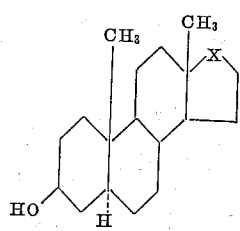

wherein X is as hereinbefore defined. Those substances are converted to a suitable ester by reaction with the appropriate acyl halide or anhydride, preferably in the presence of an acid acceptor. A particularly suitable ester is the p-toluenesulfonate, the formation of which is specifically illustrated by the reaction of 17α-methyl-5α-androstane-3β,17β-diol with p-toluenesulfonyl chloride in pyridine, thus affording the corresponding 3-p-toluenesulfonate. Reaction of the toluenesulfonyloxy group with sodium azide in a suitable organic solvent medium results in introduction of the azido group with the inversion of the stereochemical configuration. The latter p-toluenesulfonate is thus heated with sodium azide in dimethyl sulfoxide solution to afford the instant 3α-azido-17α-methyl-5α-androstan-17β-ol.

An alternate method for manufacture of the 17-hydroxy compound of this invention involves reduction of the corresponding 17-keto substance. The reaction of 3α-azido-5α-androstan-17-one with lithium tri-(tertiary-butoxy) aluminum hydride, for example, in tetrahydrofuran solution affords the instant 3α-azido-5α-androstan-17β-ol.

The 17-(lower alkanoyl)oxy compounds of this invention can be obtained alternatively by acylation of the corresponding 17-hydroxy derivative. 3α-azido-5α-androstan-17β-ol is thus contacted with acetic anhydride, for example, in the presence of pyridine to yield the corresponding 17-acetate.

The compounds of the present invention possessing a lower aliphatic hydrocarbon substituent at the 17-position can be obtained by allowing the instant 17-keto substance to react with the appropriate organo-metallic reagent. The reaction of 3α-azido-5α-androstan-17-one with lithium acetylide, for example, in tetrahydrofuran solution affords 3α-azido-17α-ethynyl-5α-androstan-17β-ol.

Partial reduction of the instant 17α-(lower alkynyl) substances is an alternate method for production of the corresponding 17α-(lower alkenyl) compounds. The hydrogenation of 3α-azido-17α-ethynyl-5α-androstan-17β-ol, for example, in pyridine solution utilizing 5% palladium-on-carbon catalyst affords 3α-azido-17α-vinyl-5α-androstan-17β-ol.

The compounds of this invention exhibit valuable pharmacological properties. They are, for example, anti-pepsin agents in view of their ability to inhibit the proteolytic action of that enzyme. In addition, they are anti-protozoal agents as is evidenced by their ability to inhibit the growth of such organisms as *Tetrahymena gelleii*.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples temperatures are given in degrees centigrade (° C.) and quantities of materials in parts by weight unless otherwise noted.

*Example 1*

To a solution of 20 parts of 3β-p-toluenesulfonyloxy-5α-androstan-17-one in 500 parts by volume of dimethyl sulfoxide is added 60 parts of sodium azide, and the resulting reaction mixture is heated at 80° for about 4 hours. After standing at room temperature for about 16 hours, the mixture is filtered in order to remove the precipitated sodium p-toluenesulfonate, and the filtrate is diluted with water, then cooled to 0–5°. The precipitate which forms is collected by filtration, then is purified by recrystallization from methanol to afford pure 3α-azido-5α-androstan-17-one, melting at about 117–118° and exhibiting an optical rotation, in chloroform, of +84.5°. This compound is represented by the following structural formula

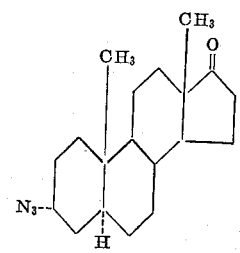

*Example 2*

To a solution of 3 parts of 3α-azido-5α-androstan-17-one in 67 parts of tetrahydrofuran is added, with stirring at 0–5°, 9 parts of lithium tri-(tertiary-butoxy) aluminum hydride. That reaction mixture is stirred for about 45 minutes, then is poured carefully into a mixture of ice and water containing excess acetic acid. The precipitate which forms is collected by filtration, washed on the filter with water and recrystallized from methanol to yield 3α-azido-5α-androstan-17β-ol, melting at about 144–145°. This compound displays an optical rotation of +3° in chloroform.

Example 3

A mixture containing one part of 3α-azido-5α-androstan-17β-ol, 5 parts of acetic anhydride and 10 parts of pyridine is stored at room temperature for about 6 hours, then is diluted carefully with water. The precipitate which forms is isolated by filtration, then is washed on the filter with water, dried in air and further purified by recrystallization from methanol to yield 3α-azido-5α-androstan-17β-ol 17-acetate, melting at about 132.5–133.5° and exhibiting an optical rotation, in chloroform, of +4.5°.

Example 4

When an equivalent quantity of propionic anhydride is substituted in the procedure of Example 3, there is produced 3α-azido-5α-androstan-17β-ol 17-propionate.

Example 5

A solution of 10 parts of 17α-methyl-5α-androstane-3β,17β-diol in 50 parts of pyridine is cooled to about 10°, and 10 parts of p-toluenesulfonyl chloride is added slowly. The resulting mixture is stirred until homogeneous, a period of about 45 minutes, then is allowed to stand at room temperature for about 16 hours. At the end of that reaction period, the mixture is poured into water, and the precipitate which forms is collected by filtration, washed with water and dried in air to yield 17α-methyl-5α-androstane-3β,17β-diol 3-p-toluenesulfonate. To the latter material is added 350 parts by volume of dimethyl sulfoxide and 45 parts of sodium azide. That mixture is heated at the reflux temperature, in a nitrogen atmosphere for about 3 hours, then is stored at room temperature for about 16 hours. Dilution with water results in separation of a solid, which is collected by filtration, washed with water, then extracted with ether. The ether extract is dried and decolorized by means of a mixture of anhydrous sodium sulfate and activated carbon, then is concentrated to dryness to afford a solid residue. That residue is purified by recrystallization from aqueous methanol to yield 3α-azido-17α-methyl-5α-androstan-17β-ol.

Example 6

When an equivalent quantity of 17α-ethyl-5α-androstane-3β,17β-diol is substituted in the procedure of Example 5, there is produced 3α-azido-17α-ethyl-5α-androstan-17β-ol.

Example 7

To a mixture of 3 parts of the 30% lithium acetylide–70% ethylene diamine complex with 27 parts of tetrahydrofuran is added, dropwise over a period of about 15 minutes, a solution of one part of 3α-azido-5α-androstan-17-one in 13.5 parts of tetrahydrofuran. The resulting reaction mixture is stirred at room temperature for about 16 hours, then is diluted carefully with saturated aqueous ammonium chloride. That mixture is extracted with ether, and the ether extract is washed successively with water and 5% aqueous sodium bicarbonate, then dried over anhydrous sodium sulfate containing decolorizing carbon and stripped of solvent by distillation under reduced pressure. The residual oil is purified by chromatography on silica gel followed by elution with benzene and recrystallization of the eluted material from aqueous methanol, thus producing pure 3α-azido-17α-ethynyl-5α-androstan-17β-ol, which displays a double melting point at 56–59° and 80–81°. It is characterized further by optical rotation, in chloroform, of −38°.

Example 8

The substitution of an equivalent quantity of lithium 1-butynylide in the procedure of Example 7 results in 3α-azido-17α-(1-butynyl)-5α-androstan-17β-ol.

Example 9

To a solution of one part of 3α-azido-17α-ethynyl-5α-androstan-17β-ol in 50 parts of pyridine is added 0.1 part of 5% palladium-on-carbon catalyst, and the resulting reaction mixture is shaken with hydrogen at atmospheric pressure and room temperature until one molecular equivalent of hydrogen is absorbed. Removal of the catalyst by filtration and evaporation of the solvent from the resulting filtrate affords an oily residue, which is purified by recrystallization from aqueous methanol to produce 3α-azido-17α-vinyl-5α-androstan-17β-ol. This compound exhibits infrared absorption maxima, in chloroform, at about 2.75, 3.41, 4.73 and 6.03 microns.

Example 10

When an equivalent quantity of 3α-azido-17α-(1-butynyl)-5α-androstan-17β-ol is substituted in the procedure of Example 9, there is obtained 3α-azido-17α-(1-butenyl)-α-5-androstan-17β-ol.

What is claimed is:

1. A compound of the formula

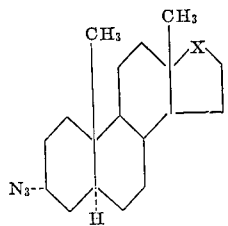

wherein X is selected from the group of radicals consisting of carbonyl and those of the formula

Y being a member of the class consisting of hydrogen and lower alkanoyl and Z being a radical selected from the group represented by the formulas $C_nH_{2n+1}$
$C_nH_{2n-1}$
$C_nH_{2n-3}$ wherein $n$ is a positive integer less than 8.

2. As in claim 1, a compound of the formula

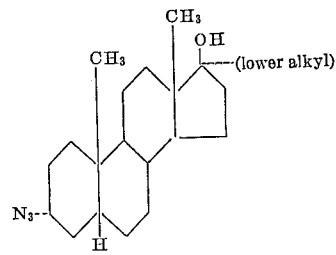

3. As in claim 1, a compound of the formula

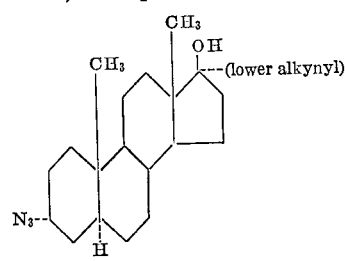

4. As in claim 1, a compound of the formula

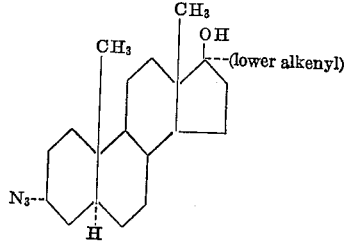

5. As in claim 1, a compound of the formula

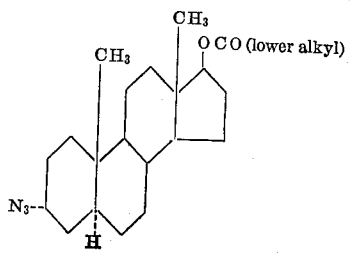

6. As in claim 1, the compound which is 3α-azido-5α-androstan-17-one.

7. As in claim 1, the compound which is 3α-azido-5α-androstan-17β-ol.

8. As in claim 1, the compound which is 3α-azido-5α-androstan-17β-ol 17-acetate.

9. As in claim 1, the compound which is 3α-azido-17α-methyl-5α-androstan-17β-ol.

10. As in claim 1, the compound which is 3α-azido-17α-ethynyl-5α-androstan-17β-ol.

References Cited

UNITED STATES PATENTS 3,238,194   3/1966   Klimstra et al _____ 260—239.5
3,246,017   4/1966   Freiberg et al. _____ 260—397.1

ELBERT L. ROBERTS, *Primary Examiner.*

E. L. ROBERTS, *Assistant Examiner.*